United States Patent [19]

Linden et al.

[11] Patent Number: 5,713,428
[45] Date of Patent: Feb. 3, 1998

[54] APPARATUS FOR REGULATING THE SPEED OF A MOTOR VEHICLE

[75] Inventors: Thomas Linden, Stuttgart; Jörg Saur, Eislingen, both of Germany

[73] Assignee: Mercedes-Benz AG, Germany

[21] Appl. No.: 617,204

[22] Filed: Mar. 18, 1996

[30] Foreign Application Priority Data

Mar. 16, 1995 [DE] Germany .................. 195 09 494.8

[51] Int. Cl.[6] .................................................. B60K 31/00
[52] U.S. Cl. ............................................. 180/179; 180/177
[58] Field of Search ................................. 180/170, 171, 180/172, 173, 174, 175, 176, 177, 178, 179; 364/426.041; 123/352, 358

[56] References Cited

U.S. PATENT DOCUMENTS 5,177,682  1/1993  Oo et al. ............................ 180/179

FOREIGN PATENT DOCUMENTS

| 0 335 333 | 10/1989 | European Pat. Off. . |
| 37 03 645 | 8/1968 | Germany . |
| 28 36 342 | 2/1980 | Germany . |
| 29 25 566 | 1/1981 | Germany . |
| 33 29 783 | 2/1985 | Germany . |
| 35 43 163 | 6/1987 | Germany . |
| 41 15 903 | 11/1991 | Germany . |

OTHER PUBLICATIONS

Patent Abstracts of Japan, 06-48216, dated Feb. 22, 1994.
"Querschnitt 4", VDO Adolf Schindling AG, Schwalbach/Ts., Mar. 1981.

Primary Examiner—Richard M. Camby
Attorney, Agent, or Firm—Evenson, McKeown, Edwards & Lenahan, P.L.L.C.

[57] ABSTRACT

The vehicle speed control arrangement according to the invention has a cruise control function module and a limitation function module to limit the speed to a variable, specified limiting speed which separates a range of permitted speeds from a range of speeds to be avoided. For the purpose of convenient and functionally reliable operation, the apparatus has an operating device for reciprocally activating either one or the other function module with simultaneous deactivation of the other module and for setting the required speed value in cruise control mode and a desired limiting-speed value in limitation mode.

6 Claims, 1 Drawing Sheet

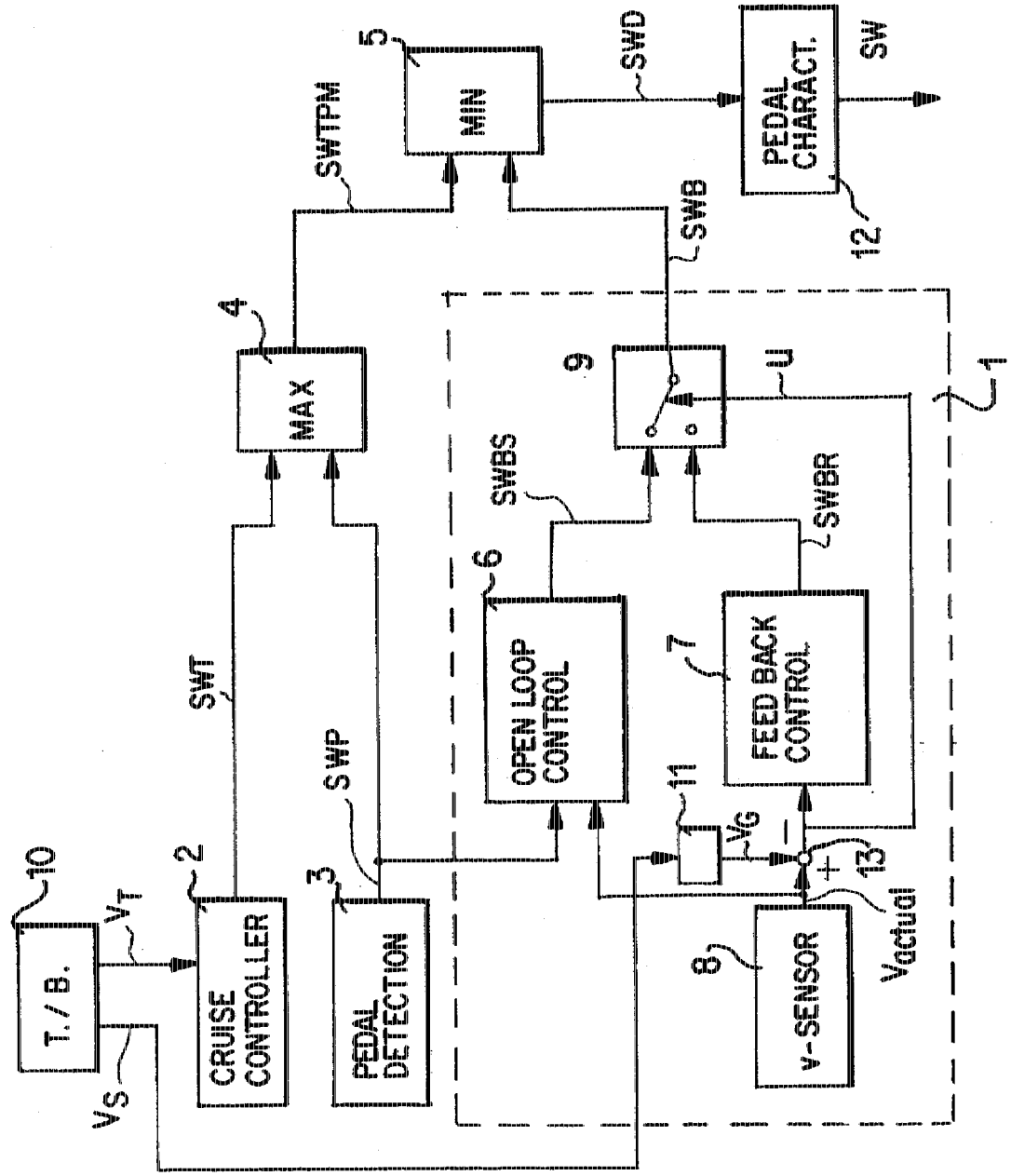

APPARATUS FOR REGULATING THE SPEED OF A MOTOR VEHICLE

BACKGROUND AND SUMMARY OF THE INVENTION

The invention relates to an apparatus for regulating the speed of a motor vehicle around an adjustable desired value.

Controls of this type are generally known as "cruise-control devices". The cruise control function consists of automatically maintaining, by regulating the speed, an actual speed of the vehicle reached at a particular time. To this end, the driver releases a cruise controller operating lever when the desired value is reached, thus activating cruise control and defining the instantaneous speed value as the required value.

The driving situation is different when a certain maximum or minimum speed is prescribed on a section of road, such as, for example, the speed-restricted zones in residential areas, in which a maximum speed of 30 km/h may be prescribed. In these instances, the driver should be able to drive at a lower speed in the case of a maximum speed limit, or at a higher speed in the case of a minimum speed limit, the intention being to prevent only exceeding or undershooting the specified limiting speed. Cruise control is not appropriate for this purpose since the activated cruise controller always attempts to establish the limiting speed and, furthermore, switches off automatically when the brakes are actuated, after which it has to be reactivated by driving to the limiting speed. There is therefore a requirement for systems by means of which the vehicle speed can be limited in the upward or downward direction to a specified limiting speed and which, at the same time, allows the vehicle to be driven at any speed on one side of this limiting speed.

The cruise controller operating lever typically has at least four functional positions, namely an "off" position, in which cruise control is switched off, a "resume" position, in which cruise control is begun with a previously stored required value, a "set and decelerate" position, in which the required speed is decremented until the operating lever is released, after which cruise control comes into action with the required speed value current at that point in time with an initial deceleration phase, and a "set and accelerate" position, which is similar to the above position but in which the required speed value is incremented and cruise control consequently begins with an acceleration phase.

German patent document DE-OS 33 29 783 Al discloses an arrangement which automatically prevents driving above a prescribed maximum speed by measures taken on the vehicle (engine-power limitation), e.g., by restricting the fuel supply, under control of a microprocessor if the maximum speed is exceeded. In a very similar manner, German patent document DE 29 25 566 Al provides a device for limiting the speed of motor vehicles which prevents a continuous infringement of the maximum speed by rendering ineffective (or making difficult) the actuation of the accelerator pedal by the driver in the event of an infringement. In both systems, the maximum speed can be adjusted, either from outside or by the driver. Another speed limiting device of this kind is disclosed in German patent document DE-OS 35 43 163 Al.

German patent document DE-OS 28 36 342 Al discloses a mechanical solution for preventing the infringement of a maximum permissible speed for a vehicle with an engine whose power can be controlled by means of an accelerator pedal. In this solution, a positioning motor on a control element which influences the power of the engine, in particular a throttle butterfly, operates to reduce the engine power irrespective of the accelerator pedal position as soon as the vehicle speed exceeds the maximum speed. The positioning motor in this case is controlled by a controller which compares the actual speed with the maximum speed and influences the positioning motor to an extent dependent on the difference between these speeds when the driving speed increases to within the vicinity of the maximum speed.

A vehicle-speed controller described in German patent document DE-OS 41 15 903 Al can also be used automatically to prevent the infringement of a specified maximum speed. Here, the regulating measure takes effect whenever the vehicle speed exceeds the prescribed maximum, and for example, by periodic interruption of the fuel supply, brake actuation and/or reduction of the throttle valve aperture. Here too, as in the case of the above-mentioned systems, intervention occurs only when the vehicle speed has reached or exceeded the specified maximum speed. The cruise control serves above all to relieve the burden on the driver on long journeys when he wishes to drive at a constant speed for a prolonged period, e.g. on sections of motorway.

An earlier German Patent Application P 44 34 022.2-32 of the applicant (corresponding U.S. application Ser. No. 08/533,818, filed Sep. 25, 1995), which is not a prior publication, describes an apparatus for regulating the speed of a motor vehicle which includes separate speed ranges for the operation of a cruise control function module, on the one hand, and a limitation function module, on the other hand. Because of the separation of these operating ranges, it is a simple matter there to use the cruise controller operating lever in the speed range for the operation of the limitation function to activate the latter, as is proposed there. There, the limiting speed can be adjusted in steps or continuously, only within the speed range not provided for cruise control.

German company publication "Querschnitt 4" [cross-section 4], VDO Adolf Schindling AG, Schwalbach/Ts., March 1981, describes an electronic accelerator pedal system which has a cruise control function, on the one hand, and a speed limitation function on the other. The speed limitation is designed as a fixed maximum for the respective vehicle in the form of a control loop which is subordinated to the cruise control and cannot be switched off.

Japanese patent document 6-48216 (A) has disclosed the possibility of using an operating lever, in a cruise control mode on the one hand, as a selector lever for cruise control operation and, in an operating mode with manual speed selection on the other hand, as a gear selector lever. An operating-mode selector switch is arranged on the operating lever for switching between the two operating modes.

One object of the present invention is to provide an apparatus of the type described above which can perform either cruise control or limitation of the speed to an adjustable limiting speed, reliably and with a high level of operating convenience.

This and other objects and advantages are achieved by the control system according to the invention, which includes both a limitation function module and a cruise control module. Preferably, when the limitation function module is activated, a controlling system intervenes to influence the speed within a previously designated range of permitted speeds, i.e., below a permissible maximum speed or above a permissible minimum speed. That is, if a speed requested by the driver exceeds the permissible maximum or is lower than the permissible minimum, the system intervenes to influence the vehicle speed, even when the actual vehicle speed is currently within the permitted range. If the difference between the actual speed of the vehicle and the specified limiting speed is substantial, such intervention is carried out by means of an open loop control, in accordance with predetermined control characteristics, as a function of the actual speed. By suitable specification of this control characteristic, the actual speed can be brought gently to the specified limiting speed, without abrupt changes in speed. If, on the other hand, the actual speed is close enough to the limiting speed, feedback control is performed instead of open loop control, ensuring that the actual speed remains in the region of the limiting speed, even if the speed demanded by the driver is in the range of speeds to be avoided.

As a further significant characteristic of the method, no system intervention takes place if the speed demanded by the driver is in the range of permitted speeds, so that, in the range of permitted speeds, the motor vehicle can be driven at any speed desired. Furthermore, a demand by the driver for a change of speed in a direction away from the limiting speed, toward the range of permitted speeds (for example, if while operating in the limiting maximum speed made, the driver applies the brakes, thus reducing the vehicle speed, from a value at or above the maximum to a value significantly below it), does not deactivate the limitation system. Rather, in contrast to active cruise control, the limitation system remains in readiness in this case, so that in the event of a subsequent attempt to accelerate beyond the maximum speed, the limitation method then prevents a maximum-speed infringement, initially by means of the open loop control and then, if required, by means of feedback control. Suitable system interventions can of course be provided in remaining speed ranges, e.g., open loop control interventions to bring the actual speed back into the region of the limiting speed if the former is initially a long way from the latter in the range of speeds to be avoided.

Further developments of the limitation function module are possible as required, as specified in the above-mentioned earlier German Patent Application P 44 34 022.2-32 (corresponding U.S. application Ser. No. 08/533,818). Compared to the apparatus disclosed there, the apparatus claimed here is distinguished, in particular, by the fact that it is possible to set any desired limiting speeds for the limitation device by means of the operating device, i.e., the speed ranges for the cruise controller function module and the limitation function module overlap. The operating device prevents the two functions from conflicting by deactivating one module as it activates the other. Another advantageous feature is that the operating device does not activate the limitation mode if a limiting-speed value has not already been set or if the actual speed is above a set maximum speed by a value that can be specified as a function of the speed, since, with this measure, unwanted operating states in the limitation mode are excluded from the outset in a simple manner.

In an advantageous further embodiment of the invention, corresponding positions of a single operating lever are provided for similar functions of the operating devices in cruise control mode, on the one hand, and limitation mode, on the other hand. In particular, it is advantageously possible here for the conventional functions of a cruise control operating lever to be transferred in a suitable manner, to the limitation mode, to set a desired variable limiting speed.

Other objects, advantages and novel features of the present invention will become apparent from the following detailed description of the invention when considered in conjunction with the accompanying drawings.

BRIEF DESCRIPTION OF THE DRAWINGS

The single FIGURE shows a schematic block diagram of an apparatus for regulating the speed of a motor vehicle to a specified maximum speed, either by cruise control or limitation, in accordance with the principles of the invention.

DETAILED DESCRIPTION OF THE DRAWING

The limitation mode which can be carried out by the apparatus described below makes it possible to limit the speed of a motor vehicle automatically to any desired, adjustable maximum speed. Limitation is accomplished by means of a limitation function module 1 which can influence engine-torque, the transmission and, if required, brake application. In addition, the apparatus contains a cruise control function module 2 of a customary type. The apparatus is suitable, for example, for vehicles with a follow-up automatic transmission and an electronic engine-control system with an electronic accelerator-pedal function.

The limitation function can be switched on and off by the driver of the vehicle by means of a switch provided on an operating device 10. The cruise controller function is switched on and off reciprocally at the same time by means of the same switch. In addition to this switch, the operating device 10 has an operating lever in the form of a customary cruise controller operating lever. When the switch is in the on position for cruise control mode, the operating lever serves as a cruise controller operating lever, with the customary functional positions of "set and decelerate", "set and accelerate", "resume" and "off" mentioned at the beginning being provided.

If the switch is in the on position for speed limitation and thus for deactivation of the cruise control mode, the operating lever serves to fulfil similar setting functions for the maximum speed in the limitation mode in the various functional positions. Specifically, the limitation function can be switched off in the functional position "off" when the change over switch is in limitation mode. In the "resume" position, the limitation mode is started with the specification of a maximum speed stored at the end of a preceding limitation-mode phase. In the functional position "set and accelerate", the instantaneously set maximum speed can be increased in the following way. If the operating lever is actuated once when no speed is already being displayed the last maximum speed set is displayed; otherwise, the instantaneous maximum speed displayed is increased by a predetermined increment, e.g. by 5 km/h or 10 km/h. If the operating lever is actuated briefly several times, there is in each case an increase in the maximum speed by the predetermined increment of, for example, 5 km/h or 10 km/h. In the case of continuous actuation of the operating lever in this position and provided no maximum speed has been displayed previously, the last maximum speed set is initially displayed and is then increased iteratively by the predetermined increment. In the case of a prolonged duration of actuation, the incrementation rate increases. The speed range which can be set for the maximum speed can be specified as desired, e.g., between a minimum speed of 30 km/h and the respective maximum vehicle speed as the maximum speed that can be set.

The functions of the operating lever in the "set and decelerate" position of the limitation mode are similar to those in the "set and accelerate" position, except that the instantaneously set maximum speed is decremented in each case instead of incremented. In particular, the three actuating modes of single actuation, multiple brief actuation and continuous actuation are again implemented with the corresponding setting functions.

Actual actuation of the limitation mode by means of the operating device 10 is possible in each case only if a maximum-speed value has been set (by manipulation of the operating lever as described above), and the actual speed exceeds the set maximum speed by no more than a predetermined amount. Otherwise, the operating device 10 prevents activation of the limitation mode since this would result in unwanted operating states. The operating range for cruise control begins a little over 30 km/h, as usual.

Optical display of the set maximum speed may be provided through dual use of an external-temperature display or of the odometer, the engine control system ascertaining whether limitation mode is present and therefore whether the maximum speed should be displayed instead of the external temperature. The maximum speed is displayed only when it is being set, when the limitation mode is activated and when the difference between the actual speed and the maximum speed falls below a predetermined value, with continued illumination of the display for a predetermined period following a setting or activation process in the limitation mode.

In order to provide the driver with information on the external temperature during prolonged periods of driving with the limitation activated (and the external-temperature display therefore switched to the display of the maximum speed), toggling between the display of maximum speed and the display of external temperature is performed, with the maximum speed being displayed for 20 seconds, for example, and the external temperature being displayed for the following 5 seconds etc. Moreover, if there is an attempt to activate the limitation mode at an actual speed above the maximum speed, the maximum-speed display is switched to a flashing mode, the driver thus receiving a corresponding warning. Similarly, an error message can be displayed in plain text if an attempt has been made to activate the limitation mode without previously setting a maximum speed. The flashing warning of the maximum-speed display is furthermore provided when the maximum speed is exceeded in the limitation mode, something which could occur, for example, when driving on steep downward slopes. A plain-text warning message can likewise be issued via the optical display if attempts at activation are made after a system fault has been detected.

An acoustic warning when the maximum speed in the limitation mode is exceeded by a predeterminable value and in the event of an attempt at activation following the detection of a system error can additionally be provided in addition to the optical warning. To detect such system faults, the cruise controller switch signals, a kick-down switch and the wheel-speed sensor signals used to determine the speed are monitored, for example, depending on vehicle equipment. If a CAN bus is present, its transmission capability is monitored. A check for tractive slip can furthermore be performed, if required, to prevent incorrect actual speed readings.

The limitation function is divided into two operating modes, namely a feedback closed loop control and an open loop control. The open loop control mode is active in a speed range of from zero to below a limiting speed which is required for closed loop control, and is set to the set maximum speed or made to approach the latter in the form of a ramp at the beginning of a limitation phase, and is also active to provide a transitional function after limitation is switched off. The feedback control mode is active when the actual speed is close to the limiting speed. If limitation is switched on at actual speeds slightly above the limiting speed, a speed reduction by means of an open loop controlling intervention, e.g., a braking intervention, downshift and/or actuation of the operating lever in the direction of deceleration can first of all be performed.

The desired mode of operation of cruise control and speed limitation is provided by the engine-torque intervention component shown in the FIGURE, which has the following structure. A unit 3 for detecting the accelerator-pedal position generates a throttle-butterfly position signal (SWP) which represents the driver's demand for engine torque, and is fed in parallel with the output signal (SWT) of the cruise control function module 2 to the input side of a maximum selection stage 4. The maximum selection stage 4 selects and transmits the one of these two signals which calls for the higher engine torque demand, as an output signal (SWTPM) which is input to a following minimum selection stage 5.

The signal (SWP) of the unit 3 which detects the accelerator-pedal position is also fed to the limitation function module 1, which performs the actual speed limitation function and which, for this purpose, comprises an open loop control unit 6, a feedback control unit 7, an actual speed sensor 8 and a changeover switch 9. The signal from the unit 3, representing engine torque demanded by the driver, is fed to the input of the open loop control unit 6, which generates an output control signal (SWBS) for the throttle butterfly position, based on the actual vehicle speed ($v_{actual}$) from the sensor 8, the engine torque demanded by the driver, and a set of predetermined characteristic curves stored therein. The output control signal (SWBS) is fed to a first terminal of the changeover switch 9. A limiting-speed setting element 11 is used to set the respective limiting speed ($v_G$) which determines the limiting regulation, setting being carried out as a function of the driver's required maximum speed ($v_S$) fed to it by the operating device 10, e.g., by setting the limiting speed ($v_G$) to the maximum speed ($v_S$) or an approach to the latter in the form of a ramp. A subtraction unit 13 on the input side of the feedback control unit 7 subtracts the limiting-speed value ($v_G$) fed in via the limiting-speed setting element 11 from the actual vehicle speed ($v_{actual}$) detected by means of the speed sensor 8 and feeds the error thus formed to the feedback control unit 7. This error signal furthermore serves as a control signal (U) for the changeover switch 9. The feedback control unit 7 (which may be a conventional PI control) generates an output signal (SWBR) for the adjustment of the throttle butterfly. This signal is fed to a second selection terminal of the changeover switch 9. Additional components which are conventional for controlling the transmission are not shown specifically to preserve clarity.

Dependent upon the magnitude of the control signal (U) from the subtraction unit 13, the changeover switch 9, transmits either the output signal (SWBS) of the open loop control unit 6 or the output signal (SWBR) of the feedback control unit 7 as the output signal (SWB) of the limitation function module 1, this output signal being fed to a further input of the minimum selection stage 5. The latter transmits the signal with the lower engine torque demand (i.e., the lower maximum throttle-butterfly opening angle) to a pedal characteristic unit 12, which, uses an accelerator-pedal progression characteristic to generate the actuating signal (SW) effective for throttle-butterfly adjustment, a procedure familiar from that for the cruise controller required value.

The reason why both an open loop control unit 7 and a closed loop control unit 6 are used in this system, is that closed loop control can be specifically designed to eliminate small deviations of the actual speed value ($v_{actual}$) from the desired value ($v_G$), while open loop control can be designed to compensate larger deviations of the actual speed ($v_{actual}$) from the desired speed value ($v_G$) in a very short time. Closed loop control by itself, which is specifically designed for compensations of small deviations of the controlled variable from the set value, cannot eliminate larger deviations in such a short time without undesirable hunting effects. The use of open loop control in addition to closed loop control solves this problem.

The limitation apparatus furthermore comprises a pressure-point setting element (not shown) which, by means of a spring with a free wheel, produces a surmountable pressure point for the accelerator pedal in a known manner. The driver can rest his foot on the pressure point and the stiffness of the accelerator pedal informs him that speed limitation is active. This avoids a situation where, with limitation active, the driver depresses the accelerator pedal a very long way because of the absence of a relationship between the engine torque and the accelerator-pedal position.

This structure of the limitation function module 1 provides the characteristics required of it. If, for example, as described above, the limitation function has been activated and the actual speed ($V_{actual}$) is significantly below the limiting speed ($V_G$), i.e., in the region for which open loop control is applicable, the cruise controller 2 is initially inactive and the maximum selection stage 4 allows the driver's demand (SWP) through to the minimum selection stage 5. At the same time, because the actual speed ($V_{actual}$) is significantly below the set limiting speed ($V_G$), the signal of the open loop control unit 6 is passed through as the output signal at the changeover switch 9, while the feedback control unit 7 remains inactive. The minimum selection stage 5 now ensures that, if the engine power demanded by the driver is above a predetermined characteristic for the maximum throttle-butterfly opening angle, the output signal (SWBS) of open loop control unit 6, which is determined by this characteristic, is passed through as the effective throttle-butterfly actuating signal, thereby implementing open loop control. If, on the other hand, the engine torque demanded by the driver is lower than the maximum allowed by this characteristic, the driver demand (SWP) is passed through by the minimum selection stage 5 to set the throttle butterfly. This ensures that the driver can drive the vehicle at any speed below the limiting speed without being affected by the limitation apparatus, while the limitation function remains ready to intervene actively when the engine torque demanded by the driver is higher than that permitted by the characteristic.

As soon as the limitation apparatus recognizes the above-mentioned changeover point from open loop to closed loop control (from the fact that the error at the input of the feedback control unit 7 is zero in value), the changeover switch 9 is switched to its other position, and the output signal (SWBR) of the feedback control unit 7 is then used as the output signal (SWB) of the limitation function module 1. The minimum selection stage 5 again ensures that, where driver demands are above the limiting speed, the system intervention which imposes a limit by regulation is effective in the setting of the throttle butterfly, while the driver's demand is allowed through as soon as it corresponds to speeds below the limiting speed.

The regulated limitation mode ensures constant speed travel at the set maximum speed until the driver specifies a smaller speed demand. To maintain this constant-speed travel, criteria comparable to those for conventional cruise control are employed. Instead of the PD-$T_1$ controller commonly used for cruise control, however, use is made of a PI controller 7, including if required a first-order time delay and gear-dependent control parameters such as well known to those skilled in the art. The range of adjustment of the throttle butterfly up to the full-load characteristic is used for regulation. In order to match the vehicle response, the engine torque calculated by the limitation regulation facility is passed via the progression characteristic used by the pedal characteristic unit 12, which sets the actual value of the throttle butterfly opening angle as a function of the predetermined maximum opening angle, as is also familiar from cruise control. The shape of the characteristic is here chosen as appropriate.

The additional cruise control function of the apparatus achieved by means of the cruise control function module 2 is of conventional nature and need not be described in detail here. In particular, in this operating mode the operating lever of the operating device 10 functions as a customary cruise controller operating lever which can be operated with an accelerating or decelerating effect on the vehicle, the actual speed reached after it has been released then serving as the required speed for cruise control.

Since, while the limitation function is active, the driver generally specifies a higher engine-torque demand than is permitted, transient functions are provided, which come into effect after the limitation function is switched off in order to increase the vehicle speed from the limiting speed to the speed demanded by the driver without an acceleration jerk. Various measures are provided for this purpose depending on the reason why the limitation function has been switched off.

If the driver switches off the limitation function by means of the operating lever of the operating device 10 there is a steady acceleration of the vehicle which does not reduce comfort, until the speed desired by the driver and specified by means of the accelerator pedal is reached. When switching off is detected, the engine torque is for this purpose increased by way of a ramp function, the steepness of which is determined by a characteristic as a function of the accelerator-pedal position. The steepness is increased with increasing deflection of the accelerator pedal, so that the vehicle acceleration effective during the transient function is higher the further the accelerator pedal is pressed. Thus, irrespective of the difference between the speed desired by the driver and the actual speed, which was previously in the region of the limiting speed, the speed demanded by the driver can always be reached approximately within the same time. If the accelerator-pedal position is changed during the speed increase in the form of a ramp, the system immediately ensures adaptation of the steepness of the ramp to the new accelerator-pedal position. If, as a result, the full-load characteristic is exceeded by a predeterminable amount, the maximum throttle-butterfly opening angle is set to 100%, and the actual throttle-butterfly position is then determined only by the accelerator-pedal position or the full-load characteristic. This, in turn, then marks the end of the transitional phase and the limitation function enters the inactive state. The transient function is, of course, also ended immediately if, during this phase, the driver reverses the accelerator-pedal position to such an extent that the engine torque demanded falls below the torque provided by the ramp function. If, during the transition phase, the driver actuates a kick-down switch for a predetermined time period, the signal provided by the system for throttle-butterfly adjustment is increased to the driver specification with a steeper ramp, thereby making available to the driver the full vehicle acceleration and ending the limitation function.

If the system detects the driver switching off the limitation function by means of the kick-down switch, this is evaluated as an attempt to accelerate as quickly as possible. In the subsequent transient function, the limitation device accordingly increases the signal for the maximum throttle-butterfly opening angle relatively quickly in accordance with a stored characteristic, after the expiry of a predeterminable tolerance time. In particular, the characteristic can contain an engine torque jump at the beginning. In addition, the transmission is influenced in such a way that a downshift into first gear is not permitted. In this case, the ending of the transient function is similar to the above-described case of switch-actuated switching off of the limitation function.

Further adaptation and indication measures can be implemented with appropriate adaptation to the respective vehicle. In the case of a vehicle with traction control, for example, the torque limitation operates in such a way as to bring about an increase during an acceleration ramp of the limitation function and hence acts against the traction control system. The demand of the traction control system for a reduction is accordingly given a higher priority. To ensure that there is no jump in the engine torque after any traction control system intervention of this kind due to an intervening increase in the value of the acceleration ramp, it is envisaged that the required engine-torque value specified by the limitation function should be halted on the ramp during the traction-control intervention and that the value as held should be taken as a starting point for continuation after the traction control system intervention.

It is self-evident that the apparatus is also fundamentally suitable for maintaining a minimum speed, for which purpose the above-described measures are to be adapted in a suitable manner to this case, which is reversed as regards the direction of the speed.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Apparatus for regulating the speed of a motor vehicle having a cruise control function module for regulating the speed around an adjustable cruise controller required speed value, and an input device by which a driver may designate a demanded speed, said apparatus comprising:

a limitation function module for limiting vehicle speed to an adjustable limiting speed which separates a range of permissible speeds from a range of speeds to be avoided, said limitation function module permitting the speed demanded by the vehicle driver as actual vehicle speed if the demanded speed is within the range of permissible speeds, and keeping the actual speed within the range of permissible speeds by means of open or closed loop control if the demanded speed is within the range of speeds to be avoided; and an operating device for reciprocal activation and deactivation of the cruise control function module and the limitation function module, and for setting the cruise controller required speed value and a desired limiting-speed value for the limitation function module.

2. Apparatus according to claim 1, wherein that the operating device comprises a switching element for switching between a cruise control mode and a limitation mode, and an operating lever for setting the cruise controller required speed value in the cruise control mode, and for setting the limiting speed in the limitation mode.

3. Apparatus according to claim 2, wherein:

the operating lever has the cruise controller settings "off", "resume", "set and accelerate" and "set and decelerate"; and in the limitation mode, the cruise control settings of the operating lever are assigned the functions "deactivate limitation mode", "activate limitation mode", "adjust limiting-speed value by incrementation" and "adjust limiting-speed value by decrementation".

4. Apparatus according to claim 2, wherein in the operating-lever position "adjust limiting-speed value by incrementation" in the limitation mode, a single actuation of the operating lever has the effect that the last limiting-speed value set is displayed initially or that an already displayed value is increased by a predetermined increment; multiple brief actuation of the operating lever increases the limiting speed value by a predetermined increment in each case; and continuous actuation of the operating lever increases the limiting-speed value continuously in an iterative manner by a predetermined increment, increasing the rate of increase as the duration of actuation lengthens.

5. Apparatus according to claim 3, wherein in the operating-lever position "adjust limiting-speed value by decrementation" in the limitation mode, a single actuation of the operating lever has the effect that the last limiting-speed value set is first of all displayed or that an already displayed value is lowered by a predetermined decrement, multiple brief actuation of the operating lever lowers the limiting-speed value by the predetermined decrement in each case and continuous actuation of the operating lever lowers the limiting-speed value continuously and in an iterative manner by the predetermined decrement, increasing the rate of decrease as the duration of actuation lengthens.

6. Apparatus according to claim 1, wherein the operating device does not perform activation of the limitation mode if a limiting-speed value has not already been set or if the actual speed is above a set maximum speed by a value that can be specified as a function of speed.

* * * * *